United States Patent
Wang

(10) Patent No.: US 10,145,999 B2
(45) Date of Patent: Dec. 4, 2018

(54) POLARIZING BEAMSPLITTER THAT PASSES S-POLARIZATION AND REFLECTS P-POLARIZATION

(71) Applicant: APPLE INC., Cupertino, CA (US)

(72) Inventor: Ligang Wang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 80 days.

(21) Appl. No.: 15/008,467

(22) Filed: Jan. 28, 2016

(65) Prior Publication Data

US 2017/0219752 A1 Aug. 3, 2017

(51) Int. Cl.
*G02B 5/30* (2006.01)
*G02B 27/28* (2006.01)

(52) U.S. Cl.
CPC .......... *G02B 5/3041* (2013.01); *G02B 5/3066* (2013.01); *G02B 27/283* (2013.01)

(58) Field of Classification Search
CPC ...... G02B 5/30; G02B 5/3025; G02B 5/3033; G02B 5/3041; G02B 5/3066; G02B 5/3075; G02B 27/28; G02B 27/283
See application file for complete search history.

(56) References Cited

U.S. PATENT DOCUMENTS

| | | | |
|---|---|---|---|
| 5,197,105 A | 3/1993 | Uemura et al. | |
| 5,926,317 A * | 7/1999 | Cushing | G02B 5/288 |
| | | | 359/588 |
| 6,487,014 B2 | 11/2002 | Li | |
| 6,507,326 B2 | 1/2003 | Manabe et al. | |
| 6,910,771 B1 | 6/2005 | Lee | |
| 7,379,242 B2 | 5/2008 | Ushigome | |
| 7,562,984 B2 | 7/2009 | Ushigome | |
| 8,000,020 B2 | 8/2011 | Amitai | |
| 8,144,379 B2 | 3/2012 | Ito et al. | |
| 8,339,707 B2 | 12/2012 | Oya et al. | |
| 8,462,434 B2 | 6/2013 | Sano | |
| 8,703,252 B2 | 4/2014 | Oya et al. | |
| 8,817,371 B1 | 8/2014 | Boothroyd | |
| 2003/0128432 A1 * | 7/2003 | Cormack | G02B 5/288 |
| | | | 359/577 |
| 2004/0008928 A1 * | 1/2004 | Gerken | G02B 27/148 |
| | | | 385/24 |
| 2005/0174642 A1 * | 8/2005 | Tokunaga | G02B 5/3033 |
| | | | 359/487.05 |
| 2007/0115552 A1 | 5/2007 | Robinson et al. | |
| 2007/0223078 A1 * | 9/2007 | Yao | G01J 4/00 |
| | | | 359/259 |
| 2007/0264447 A1 | 11/2007 | Oya et al. | |
| 2013/0188254 A1 | 7/2013 | Li et al. | |

* cited by examiner

*Primary Examiner* — Derek S Chapel
*Assistant Examiner* — Adam W Booher
(74) *Attorney, Agent, or Firm* — D. Kligler IP Services Ltd.

(57) ABSTRACT

An optical element includes a transparent substrate having a planar front surface, and a multilayer structure, which is formed on the front surface of the substrate and includes multiple thin film layers, including an outer layer that is exposed to ambient air. The multilayer structure defines, at a target wavelength, a series of resonant cavities that create, for a beam of light at the target wavelength that is incident on the optical element at a target angle, a passband for an s-polarization component of the beam and a stopband for a p-polarization component of the beam.

18 Claims, 4 Drawing Sheets

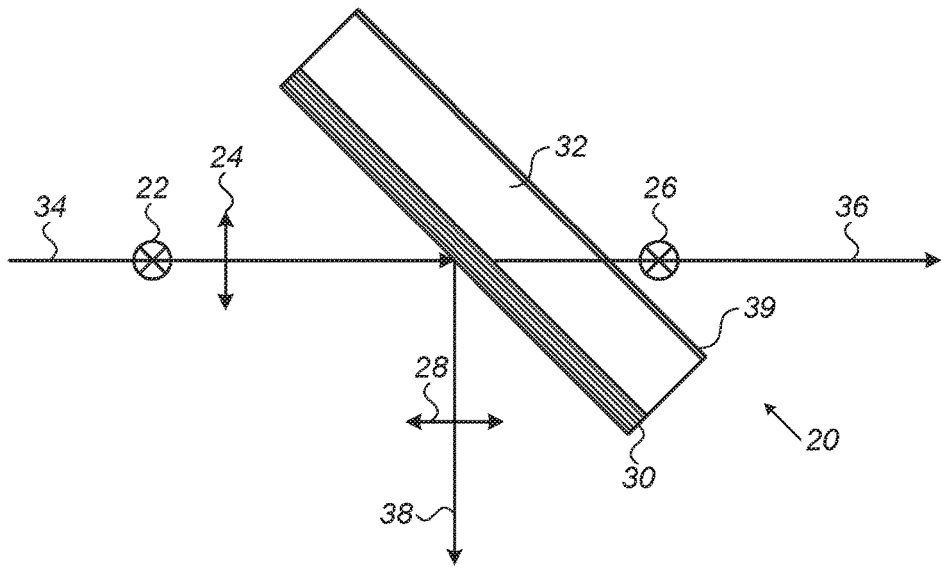
FIG.1
FIG. 2
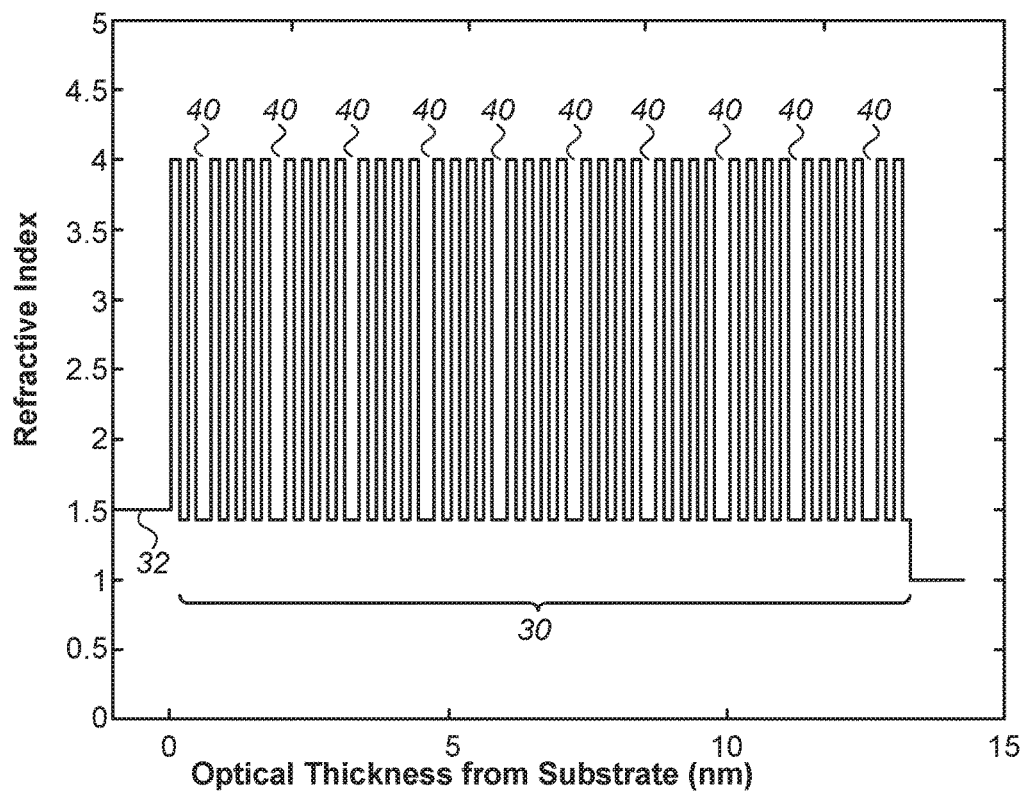

POLARIZING BEAMSPLITTER THAT PASSES S-POLARIZATION AND REFLECTS P-POLARIZATION

FIELD OF THE INVENTION

The present invention relates generally to optical elements, and particularly to polarizing beamsplitters.

BACKGROUND

Polarizing beamsplitters are commonly used in optical systems to separate unpolarized light into orthogonal polarizations, so that each orthogonal polarization component propagates in a separate direction, or to combine orthogonal polarization components arriving from separate directions into one common propagation direction. The established convention refers to the orthogonal linear polarization components as s-polarization and p-polarization. The notation of s and p refers to the plane of incidence of the light on an optical surface, which is defined as the plane containing the normal of the surface onto which the light impinges, and the direction of propagation of the light. Using the plane of incidence as reference, s-polarization is defined as the polarization in which the electrical field vector of the light waves is perpendicular to the plane of incidence, and p-polarization is defined as the polarization in which the electrical field vector of the electromagnetic field is contained within the plane of incidence.

Various types of polarizing beamsplitters are known in the art. For example, polarizing beamsplitters based on the birefringence of crystalline materials, such as Glan-laser and Glan-Thompson beamsplitters, are manufactured of high-grade calcite prisms, which are joined together. These beamsplitters transmit either p-polarization (Glan-laser) or s-polarization (Glan-Thompson), and exhibit a high degree of separation of the polarization components, as well as low absorption. The angle of deviation between the propagation directions of the two polarization components is either larger than 90° (Glan-laser) or smaller than 90° (Glan-Thompson).

Polarization beamsplitters based on a wire grid comprise an array of parallel metallic wires sandwiched between two glass prisms. The wire grid has the property of transmitting one polarization component and reflecting the other, depending upon the orientation of the wires. Due to the metallic composition, beamsplitters based on wire grids exhibit absorption losses of up to 30%.

A MacNeille polarizing beamsplitter cube comprises two glass prisms cemented together along their hypotenuse surfaces, with a multilayer dielectric coating between the prisms. The deviation between the two polarization components can be 90°. The MacNeille polarizing beamsplitter cube transmits p-polarization and reflects s-polarization.

SUMMARY

Embodiments of the present invention that are described hereinbelow provide improved optical elements for splitting and combining light of different polarizations.

Embodiments of the present invention that are described hereinbelow provide improved optical elements for splitting and combining light of different polarizations.

There is therefore provided, in accordance with an embodiment of the present invention, an optical element, including a transparent substrate having a planar front surface, and a multilayer structure, which is formed on the front surface of the substrate and includes multiple thin film layers, including an outer layer that is exposed to ambient air. The multilayer structure defines, at a target wavelength, a series of resonant cavities that create, for a beam of light at the target wavelength that is incident on the optical element at a target angle, a passband for an s-polarization component of the beam and a stopband for a p-polarization component of the beam.

In a disclosed embodiment, the optical element includes a transparent substrate having a planar front surface, and a multilayer structure, which is formed on the front surface of the substrate and includes multiple thin film layers, including an outer layer that is exposed to ambient air, the multilayer structure defining, at a target wavelength, a series of resonant cavities that create, for a beam of light at the target wavelength that is incident on the optical element at a target angle, a passband for an s-polarization component of the beam and a stopband for a p-polarization component of the beam.

In some embodiments, the multilayer structure includes exactly two different materials with alternating high refractive index and low refractive index layers. In a disclosed embodiment, the materials are Si and $SiO_2$.

In the disclosed embodiments, the target angle is 45°. Typically, no additional cover material is applied over the thin film multilayer structure. In the disclosed embodiments, the substrate and multilayer structure do not include any birefringent materials.

In still other embodiments, a coating is deposited over a back side of the substrate, wherein the coating suppresses transmission of all polarization components outside the passband of the s-polarization component.

In some embodiments, the series of resonant cavities is further configured to create, in a further spectral range that does not contain the target wavelength, a further passband for the p-polarization component of the beam and a further stopband for the s-polarization component of the beam.

There is also provided, in accordance with an embodiment of the present invention, a method for producing an optical element. The method includes providing a transparent substrate having a planar front surface, and forming on the front surface a multilayer structure including multiple thin film layers, including an outer layer that is exposed to ambient air. The multilayer structure defines, at a target wavelength, a series of resonant cavities that create, for a beam of light at the target wavelength that is incident on the optical element at a target angle, a passband for an s-polarization component of the beam and a stopband for a p-polarization component of the beam.

There is additionally provided, in accordance with an embodiment of the present invention, a method for multiplexing and demultiplexing light. The method includes providing an optical element including a transparent substrate having a planar front surface and a multilayer structure formed on the front surface including multiple thin film layers that define a series of resonant cavities arranged to create in a first spectral range a first stopband for p-polarized light and a first passband for s-polarized light, and to create in a second spectral range, which does not overlap with the first spectral range, a second passband for p-polarized light and a second stopband for s-polarized light. One or more beams of light having polarization and spectral components in the first and second spectral ranges are directed to impinge on the optical element at the target angle so as to multiplex or demultiplex the beams in the first and second spectral ranges.

The present invention will be more fully understood from the following detailed description of the embodiments thereof, taken together with the drawings in which:

BRIEF DESCRIPTION OF THE DRAWINGS

FIG. 1 is a schematic side view of a polarizing beamsplitter, in accordance with an embodiment of the invention;

FIG. 2 is a schematic representation of an initial design of a multilayer structure of a polarizing beamsplitter, in accordance with an embodiment of the invention;

DETAILED DESCRIPTION OF EMBODIMENTS

Figure 3:
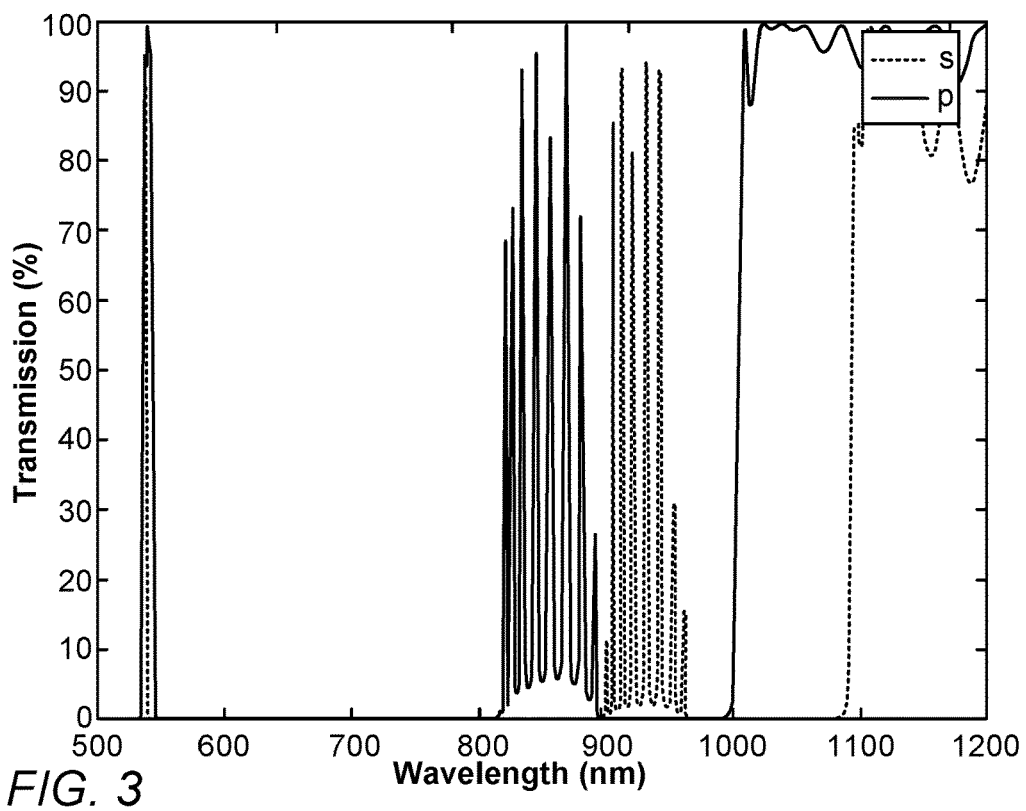
FIG. 3 is a calculated transmission spectrum of the initial design of the multilayer structure, in accordance with an embodiment of the invention.

Conventional plate polarizing beamsplitters are typically based on a highly reflective spectral band from a quarter-wave stack. At normal incidence, the reflection band is centered at the reference wavelength where the quarter-wave optical thickness is defined. When the plate is turned so that the incident light shifts from normal incidence to an increasingly oblique angle, the center of the reflection band shifts toward shorter wavelengths. The amount of shift is the same for both polarizations. However, the width of the reflection band increases for s-polarized light but decreases for p-polarized light. As a result, near the edge of the reflection band a polarization splitting occurs, where s-polarization is reflected and p-polarization is transmitted. This polarization splitting forms the basis for the plate polarizing beamsplitter. If one were to desire from a conventional beamsplitter to transmit s-polarization and reflect p-polarization, the use of additional half-wave plates would be required in combination with the plate beamsplitter.

The embodiments of the present invention that are described herein result in a single optical element comprising following properties: It is a polarizing beamsplitter that transmits s-polarization and reflects p-polarization, while the beam-splitting multilayer structure coating faces air (rather than being located in the interface between two transparent substrates, such as prisms). The deviation angle between the polarizations can be chosen to be 90° or possibly some other desired deviation. The absorption of the incident light is low, typically no more than a few percent.

This novel design is advantageous for compact optical systems in which a thin, lightweight polarizing beamsplitter is required with the above-mentioned properties. Depositing the polarizing multilayer coating over a single substrate, without any additional cover material, minimizes the material used for the beamsplitter, yielding a lightweight and compact component, and reduces the labor required for its production. In addition, limiting the materials required for the coating to no more than two different materials further simplifies the production process. In the disclosed embodiments, the substrate comprises a transparent plate, but alternatively other sorts of transparent substrates having a planar front surface may be used. Thus, in addition to the flat plate used in the present embodiments, the substrate may have any other shape useful for refracting, reflecting, or otherwise manipulating the s-polarized light that has been transmitted by the beamsplitter coating.

The starting design for an embodiment of the present invention is a multilayer structure that defines a series of resonant cavities, such as Fabry-Perot cavities, at a reference wavelength on the planar front surface of a transparent substrate. A starting design of this kind is substantially different from the starting design for a conventional polarizing beamsplitter, as previously described. As will be described in detail in the context of the figures, the starting design with multiple cavities exhibits a narrow passband at the reference wavelength, surrounded by a stopband, as well as broader multi-peaked passbands at both higher and lower wavelength regions, as will be described in further detail in the context of the figures. These broader, multi-peaked passbands are significant for the embodiments of the present invention.

Tilting the front surface with the multilayer structure to a 45° angle with respect to the incident light leads, besides to a shift of the spectral features to shorter wavelengths, to a split of each multi-peaked passband between the two polarizations and a relative offset between them. This offset is due to the different values of the effective index $n_{eff}$ for the s- and p-polarizations. The offset between these longer-wavelength passbands for the two polarizations, in turn, provides in specific spectral areas, including a target wavelength of the design, a low transmittance to p-polarization, while the transmittance of s-polarization is high. Further optimization of the multilayer design, using commercially available thin film design software, can be employed for improving the transmittance of s-polarization and suppressing its ripple. The described design process provides a spectral band in which s-polarization is essentially transmitted by the beamsplitter, while p-polarization is essentially reflected by the beamsplitter.

Although the description that follows relates specifically to the use of a polarizing beamsplitter in separating unpolarized light into polarized components, such beamsplitters may alternatively be applied to light of linear polarization, elliptical polarization, or circular polarization, as is known in the art. Furthermore, beamsplitters produced in accordance with the principles of the present invention may similarly be used as beam combiners, to combine input beams of s- and p-polarized light into a single output beam of mixed polarization.

FIG. 1 is a schematic side view of a polarizing beamsplitter 20, showing the splitting of incident s-polarization 22 and p-polarization 24 into a transmitted s-polarization 26 and a reflected p-polarization 28, according to an embodiment of the present invention. A multilayer structure 30, comprising multiple thin film layers, is formed on a transparent substrate 32, for example a transparent plate. The depicted substrate and multilayer structure thicknesses are not to scale, as a typical substrate thickness is a few millimeters, and a typical total thickness of multilayer structure 30 is a few microns. Moreover, multilayer structure 30 typically comprises several tens of layers, with individual layer thicknesses of the order of 10 or 100 nanometers. No additional cover material is applied over multilayer structure 30, and neither multilayer structure 30 nor substrate 32 comprises any birefringent materials.

Incident light 34, containing both s-polarized light and p-polarized light 24, is incident on the front surface of the polarizing beamsplitter 20 at an angle of 45°. The polarization components 22 and 24 are drawn using conventional optical notation for polarized light. The light 36 transmitted by the polarizing beamsplitter 20 contains essentially only s-polarized light 26, whereas the light 38 reflected by the beamsplitter contains essentially only p-polarized light 28. For the sake of clarity, the refraction of transmitted light 36 due to the substrate 32 is not shown.

FIGS. 2-3 show a starting design of multilayer structure 30 of polarizing beamsplitter 20, as well as the transmission spectrum of the starting design at a 45° tilt with respect to incident light 34, in accordance with an embodiment of the invention.

FIG. 2 is a schematic representation of the starting design of multilayer structure 30, wherein the optical thicknesses of the layers are shown on the horizontal axis, and the refractive indexes on the vertical axis. The layers making up multilayer structure 30, as well as substrate 32, are marked on the schematic representation, with the order of layers from left to right being that from substrate to incident medium. Multilayer structure 30 comprises ten Fabry-Perot cavities, as can be recognized from ten relatively thick low-index layers 40. These ten layers 40 form, together with the surrounding multilayers, ten resonant Fabry-Perot cavities in series, with the effective cavity length being $\lambda/2$ at the reference wavelength. The alternating thin film layers of high- and low-index transparent materials form the reflectors of the Fabry-Perot cavities. The materials of the thin films in this example are Si and $SiO_2$, with refractive indexes of 4.000 and 1.435, respectively, at wavelength 950 nm, although the principles of this embodiment may similarly be applied using different sorts of materials. Substrate 32 is optical glass of type BK7, with a refractive index of 1.508 at 950 nm, and the incident medium is air. For simplicity, the extinction coefficients of both thin film materials are assumed to be zero. The reference wavelength for the design is 595 nm.

At zero-degree angle of incidence, the calculated transmission spectrum (not shown) for the starting design exhibits a narrow bassband at the reference wavelength of 595 nm, as well as a multi-peaked passband between 930 nm and 1000 nm. In addition, another multi-peaked passband is formed between 430 nm and 440 nm. The description that follows relates to an embodiment utilizing the multi-peaked passband between the wavelengths 930 nm and 1000 nm. An embodiment utilizing the multi-peaked passband between 430 nm and 440 nm can be constructed in an analogous fashion.

FIG. 3 is a calculated transmission spectrum from 500 nm to 1200 nm for the starting design of FIG. 2, with polarizing beamsplitter 20 tilted by 45° with respect to incident light 34. The narrow passband formed by the Fabry-Perot cavities in series is now slightly below 550 nm due to the spectral shift associated with the tilt of 45°. The multi-peaked passband at zero-degree angle of incidence has now split and moved to shorter wavelengths, with the p-polarization multi-peaked passband found between 820 nm an 900 nm, and the s-polarization multi-peaked passband found between 900 nm and 960 nm. For example, around wavelength 940 nm, the transmittance for the p-polarization is low, while the transmittance for the s-polarization is much higher. Although the transmission spectrum for s-polarization demonstrates substantial ripple, this difference of the transmittances for the two polarizations already points to a transmission spectrum that is fundamentally different from that of a conventional polarization beamsplitter with a high p-transmittance and low s-transmittance.

Figure 4:
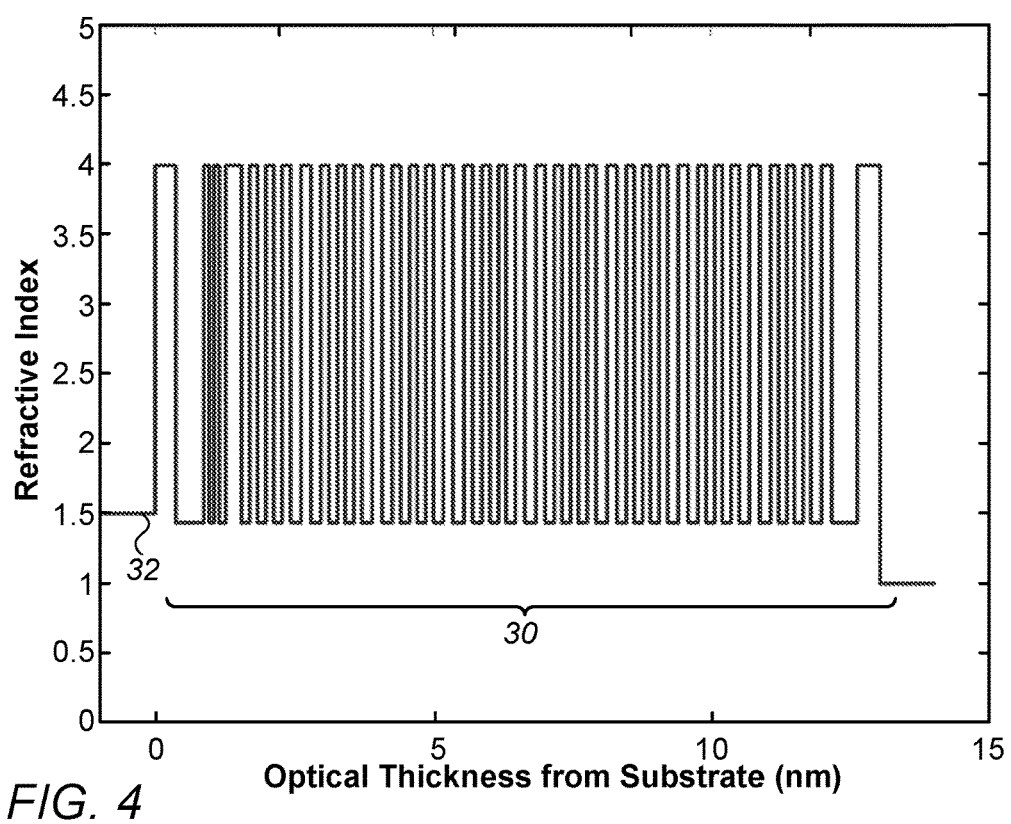
FIG. 4 is a schematic representation of an optimized structure of a polarizing beamsplitter, in accordance with an embodiment of the invention.
Figure 5:
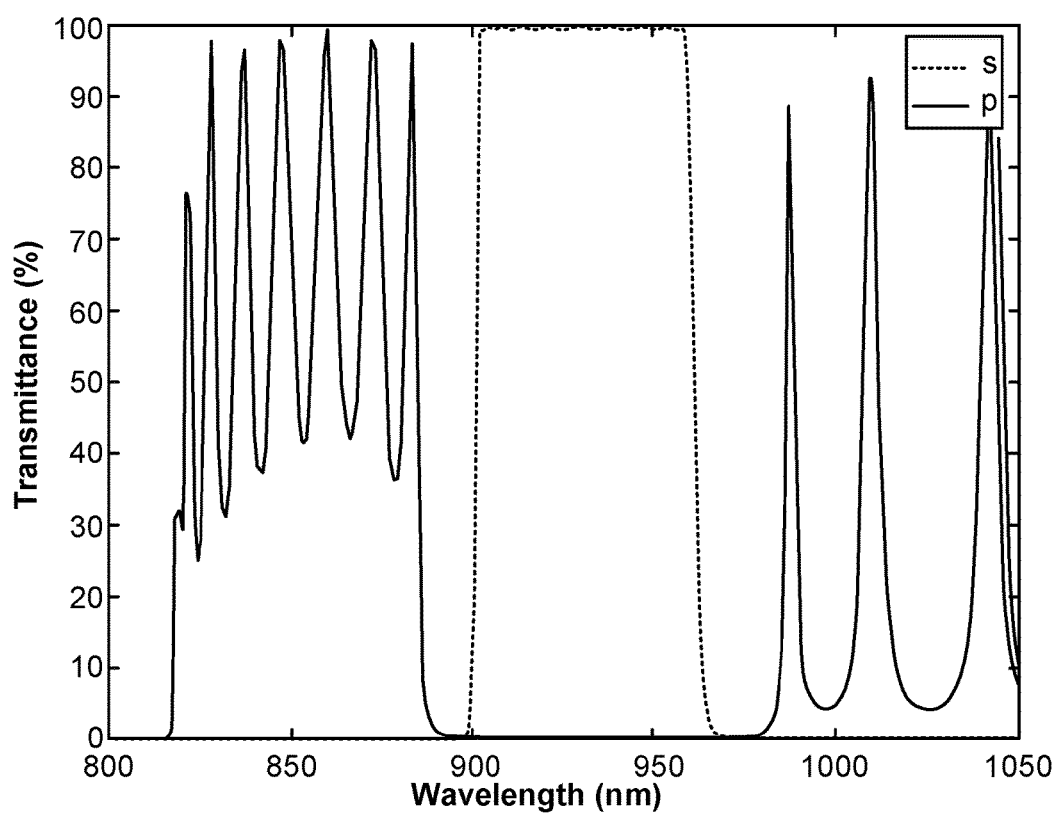
FIG. 5 is a calculated transmission spectrum of the optimized multilayer structure, in accordance with an embodiment of the invention.

FIGS. 4-5 show an optimized design for multilayer structure 30 of the polarizing beamsplitter 20, as well as the transmission spectrum of the optimized design at 45° with respect to incident light, in accordance with an embodiment of the invention.

FIG. 4 is a schematic representation of a multilayer structure design after optimizing the starting design of FIG. 2, with the goal of reducing the ripple of s-polarization in the passband around a target wavelength of 940 nm. As in FIG. 2, the layers making up multilayer 30, as well as substrate 32, are marked on the schematic representation. The optimization can be performed using commercially available thin film design software, such as TFCalc, available from Software Spectra, Inc. (Portland, Oreg.). The layer count after the optimization is 75, and the total metric thickness is 6.28 μm.

The numerical values for the film thicknesses in the multilayer structure are given in Table 1, below. The strict periodicity of the starting design of FIG. 2 is modified by the optimization process in order to achieve the desired performance of polarizing beamsplitter 20.

TABLE 1

| Layer Count | Material | Thickness (nm) |
|---|---|---|
| Substrate | BK7 | — |
| 1 | Si | 92.35 |
| 2 | $SiO_2$ | 344.67 |
| 3 | Si | 24.37 |
| 4 | $SiO_2$ | 61.64 |
| 5 | Si | 23.29 |
| 6 | $SiO_2$ | 82.34 |
| 7 | Si | 71.83 |
| 8 | $SiO_2$ | 100.63 |
| 9 | Si | 35.72 |
| 10 | $SiO_2$ | 106.29 |
| 11 | Si | 33.75 |
| 12 | $SiO_2$ | 108.19 |
| 13 | Si | 37.53 |
| 14 | $SiO_2$ | 134.22 |
| 15 | Si | 45.03 |
| 16 | $SiO_2$ | 123.44 |
| 17 | Si | 36.16 |
| 18 | $SiO_2$ | 108.92 |
| 19 | Si | 34.62 |
| 20 | $SiO_2$ | 109.05 |
| 21 | Si | 36.81 |
| 22 | $SiO_2$ | 125.79 |
| 23 | Si | 45.7 |
| 24 | $SiO_2$ | 127.77 |
| 25 | Si | 37.78 |
| 26 | $SiO_2$ | 110.7 |
| 27 | Si | 34.79 |
| 28 | $SiO_2$ | 106.71 |
| 29 | Si | 35.71 |
| 30 | $SiO_2$ | 122.32 |
| 31 | Si | 44.27 |
| 32 | $SiO_2$ | 136.93 |
| 33 | Si | 39.55 |
| 34 | $SiO_2$ | 111.21 |
| 35 | Si | 34.64 |
| 36 | $SiO_2$ | 107.3 |
| 37 | Si | 35.26 |
| 38 | $SiO_2$ | 116.88 |
| 39 | Si | 42.28 |
| 40 | $SiO_2$ | 140.85 |
| 41 | Si | 41.36 |
| 42 | $SiO_2$ | 115.02 |
| 43 | Si | 34.83 |
| 44 | $SiO_2$ | 106.69 |
| 45 | Si | 35.04 |
| 46 | $SiO_2$ | 113.56 |

TABLE 1-continued

| Layer Count | Material | Thickness (nm) |
|---|---|---|
| 47 | Si | 39.99 |
| 48 | SiO$_2$ | 139.14 |
| 49 | Si | 43.5 |
| 50 | SiO$_2$ | 118.53 |
| 51 | Si | 35.86 |
| 52 | SiO$_2$ | 106.6 |
| 53 | Si | 34.32 |
| 54 | SiO$_2$ | 111.59 |
| 55 | Si | 38.54 |
| 56 | SiO$_2$ | 135.63 |
| 57 | Si | 44.17 |
| 58 | SiO$_2$ | 125.47 |
| 59 | Si | 35.91 |
| 60 | SiO$_2$ | 107.45 |
| 61 | Si | 34.22 |
| 62 | SiO$_2$ | 109.88 |
| 63 | Si | 37.69 |
| 64 | SiO$_2$ | 127.37 |
| 65 | Si | 45.75 |
| 66 | SiO$_2$ | 130.26 |
| 67 | Si | 36.53 |
| 68 | SiO$_2$ | 105.21 |
| 69 | Si | 33.49 |
| 70 | SiO$_2$ | 107.25 |
| 71 | Si | 36.2 |
| 72 | SiO$_2$ | 133.96 |
| 73 | Si | 45.71 |
| 74 | SiO$_2$ | 319.37 |
| 75 | Si | 103.96 |
| Incident medium | Air | — |

FIG. 5 is a calculated transmission spectrum from 800 nm to 1050 nm for the design of FIG. 4 and Table 1. An expanded spectral scale, relative to that of FIG. 3 is used in order to demonstrate the spectral behavior in the specific area of interest. The transmission spectrum shows that between the wavelengths of 905 nm and 960 nm the calculated transmission of s-polarization is very close to 100%, whereas that of p-polarization is 0%. Hence, the beamsplitter transmits substantially all of s-polarization and reflects all of p-polarization.

Figure 6:
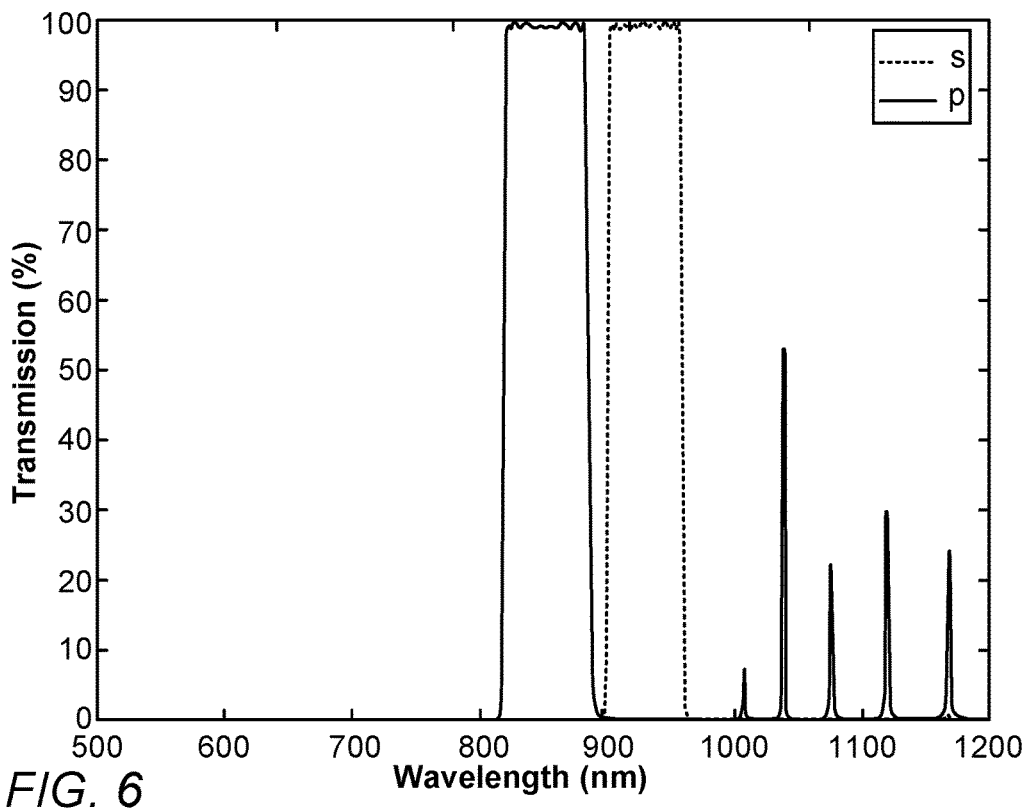
FIG. 6 is a calculated transmission spectrum of a multilayer structure, in accordance with another embodiment of the invention.
Figure 7:
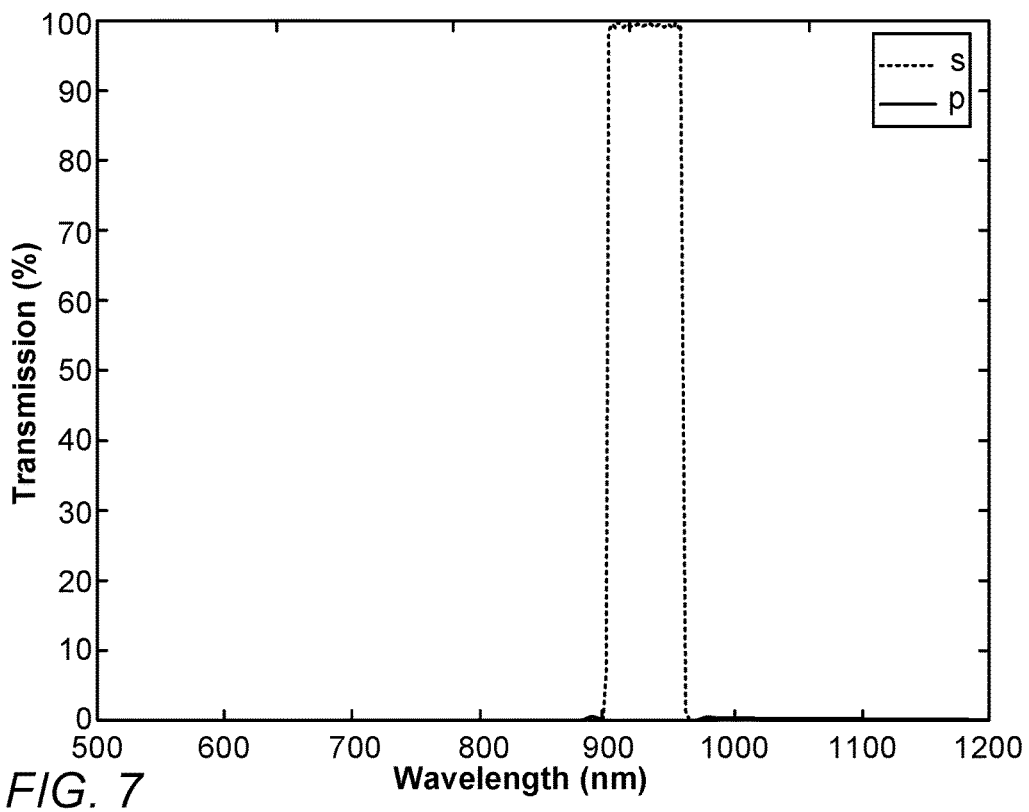
FIG. 7 is a calculated transmission spectrum of a multilayer structure, in accordance with yet another embodiment of the invention.

FIGS. 6-7 show two transmission spectra, in accordance with other embodiments of the invention. FIG. 6 shows how one multilayer stack 30 can perform both as a conventional polarizing beamsplitter and a polarizing beamsplitter as depicted in FIGS. 4-5. FIG. 7 showing a polarizing beamsplitter of FIGS. 4-5 with all spectral components outside the s-polarization passband removed.

FIG. 6 shows a calculated transmission spectrum resulting from a different optimization process from that resulting in the transmission spectrum of FIG. 5, but still applied to the same starting structure as was depicted in FIG. 2. Now multilayer structure 30 is optimized for generating a conventional polarizing beamsplitter, transmitting p-polarization and reflecting s-polarization, in a spectral range adjacent to the region with the high s-polarization transmittance of FIG. 5. The calculated transmittance is shown in FIG. 6, wherein the functionality of a conventional p-transmitting polarizing beamsplitter is realized between wavelengths of 820 nm and 895 nm, with near-100% transmittance for p-polarization and 0% transmittance for s-polarization. The optimization converts the highly oscillating transmission of p-polarization in the spectral range between 820 nm and 895 nm, shown in FIG. 5, to a near-100% transmittance, while the high s-polarization transmittance and zero p-polarization transmittance between the wavelengths of 905 nm and 960 nm (FIG. 5) remain substantially unchanged.

The spectral behavior shown in FIG. 6 can be utilized, inter alia, for multiplexing and demultiplexing based on wavelength and polarization. As an example, unpolarized light comprising wavelengths 850 nm and 940 nm, impinging on the polarizing beamsplitter of FIG. 6, will be split into transmitted light 36 of p-polarization at 850 nm and s-polarization at 940 nm, and reflected light 38 of p-polarization at 940 nm and s-polarization at 850 nm.

In the preceding embodiments, it has been assumed that a perfect anti-reflective coating is applied to the back side of the substrate 32. However, different coatings can also be utilized instead of an antireflective coating in order to achieve additional spectral functionality.

Thus, for example, FIG. 7 shows a transmission spectrum, wherein, through the use of an appropriate coating 39 on the back side of substrate 32 (as shown in FIG. 1), the transmission of FIG. 5 outside of the passband of high s-polarization transmission is suppressed for both polarizations.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical element, comprising:
a transparent substrate having a planar front surface; and
a multilayer structure, which is formed on the front surface of the substrate and comprises multiple thin film layers, including an outer layer that is exposed to ambient air, the multilayer structure defining a series of resonant cavities that create, for a first beam of light at any wavelength within a first spectral range that is incident on the optical element at a target angle, a first passband in which at least 90% of an s-polarization component of the first beam is transmitted through the optical element and a first stopband in which less than 10% of a p-polarization component of the first beam is transmitted through the optical element, and create, for a second beam of light at any wavelength within a second spectral range, adjacent to the first spectral range, a second passband in which at least 90% of a p-polarization component of the second beam is transmitted through the optical element and a second stopband in which less than 10% of an s-polarization component of the second beam is transmitted through the optical element,
wherein the first passband and the first stopband have first widths of at least 20 nm, and the second passband and the second stopband have second widths of at least 20 nm.

2. The optical element according to claim 1, wherein the multilayer structure comprises exactly two different materials.

3. The optical element according to claim 2, where the two materials comprise alternating high refractive index and low refractive index layers.

4. The optical element according to claim 2, wherein the two materials are Si and SiO$_2$.

5. The optical element according to claim 1, wherein the target angle is 45°.

6. The optical element according to claim 1, wherein no additional cover material is applied over the multilayer structure.

7. The optical element according to claim 1, wherein the substrate and multilayer structure do not comprise any birefringent materials.

8. The optical element according to claim 1, and comprising a coating deposited over a back side of the substrate, wherein the coating suppresses transmission of all polarization components outside the first passband of the s-polarization component.

9. A method for producing an optical element, the method comprising:
providing a transparent substrate having a planar front surface; and
forming on the front surface a multilayer structure comprising multiple thin film layers, including an outer layer that is exposed to ambient air, the multilayer structure defining a series of resonant cavities that create, for a first beam of light at any wavelength within a first spectral range that is incident on the optical element at a target angle, a first passband in which at least 90% of an s-polarization component of the first beam is transmitted through the optical element and a first stopband in which less than 10% of a p-polarization component of the first beam is transmitted through the optical element, and create, for a second beam of light at any wavelength within a second spectral range, adjacent to the first spectral range, a second passband in which at least 90% of a p-polarization component of the second beam is transmitted through the optical element and a second stopband in which less than 10% of an s-polarization component of the second beam is transmitted through the optical element,
wherein the first passband and the first stopband have first widths of at least 20 nm, and the second passband and the second stopband have second widths of at least 20 nm.

10. The method according to claim 9, wherein forming the multilayer structure comprises depositing exactly two different materials over the substrate.

11. The method according to claim 10, wherein depositing the exactly two different materials comprises depositing alternating high refractive index and low refractive index layers.

12. The method according to claim 11, wherein the two materials are Si and $SiO_2$.

13. The method according to claim 9, wherein the target angle is 45°.

14. The method according to claim 9, wherein no additional cover material is applied over the multilayer structure.

15. The method according to claim 9, wherein the substrate and multilayer structure do not comprise any birefringent materials.

16. The method according to claim 9, wherein forming the multilayer structure comprises designing the multilayer structure by defining an initial structure of the resonant cavities and optimizing the initial structure to achieve a transmission spectrum with the first and second passbands and the first and second stopbands.

17. The method according to claim 9, and comprising depositing a coating over a back side of the substrate, wherein the coating suppresses transmission of all polarization components outside the first passband of the s-polarization component.

18. A method for multiplexing and demultiplexing light, comprising:
providing an optical element comprising a transparent substrate having a planar front surface and a multilayer structure formed on the front surface comprising multiple thin film layers that define a series of resonant cavities arranged to create a first stopband in which less than 10% of p-polarized light is transmitted through the optical element and a first passband in which at least 90% of s-polarized light is transmitted through the optical element, wherein the first stopband and the first passband extend over a first spectral range, and to create a second passband in which at least 90% of p-polarized light is transmitted through the optical element and a second stopband in which less than 10% of s-polarized light is transmitted through the optical element, wherein the second stopband and the second passband extend over a second spectral range, which is adjacent to and does not overlap with the first spectral range,
wherein the first passband and the first stopband have first widths of at least 20 nm, and the second passband and the second stopband have second widths of at least 20 nm; and
directing one or more beams of light having polarization and spectral components in the first and second spectral ranges to impinge on the optical element at the target angle so as to multiplex or demultiplex the beams in the first and second spectral ranges.

* * * * *